METHOD OF MAKING A FACSIMILE OF A SKIN FRICTION-RIDGE PATTERN

Filed Feb. 15, 1968

2 Sheets-Sheet 1

WALLACE H. NEWKIRK
JAMES K. WINTERS,
INVENTORS

BY Charles W. McHugh
AGENT

WALLACE H. NEWKIRK
JAMES K. WINTERS,
INVENTORS
BY
AGENT

United States Patent Office 3,533,823
Patented Oct. 13, 1970

3,533,823

METHOD OF MAKING A FACSIMILE OF A SKIN FRICTION-RIDGE PATTERN

Wallace H. Newkirk, Cupertino, Calif., and James K. Winters, Arlington, Tex., assignors to Ling-Temco-Vought, Inc., Dallas, Tex., a corporation of Delaware Filed Feb. 15, 1968, Ser. No. 705,704
Int. Cl. B41m *3/00*
U.S. Cl. 117—.5 8 Claims

ABSTRACT OF THE DISCLOSURE

A method and apparatus that utilizes a thermochromic material which exhibits hysteresis in changing reflectivity as a result of a change in temperature, wherein the material is uniformly heated to above body temperature, (98.6° F.), where it manifests a reduced reflectivity, i.e., its high-temperature reflectivity, and then certain portions of the material are cooled as a result of contact by the friction ridges on a finger or the like, so that the cooled portions exhibit a reflectivity which differs from other portions.

This invention relates to a method and apparatus for forming a thermal image of a portion of skin having distinctive ridges, said image being formed in thermochromic material which exhibits hysteresis.

It is well known that a certain group of materials which are commonly known as thermochromic or thermosensitive materials are particularly useful for demonstrating certain heat phenomena because of their ability to change color rather dramatically as they experience certain temperature changes. For example, cuprous mercuric iodide is reported to change from a bright red at room temperature to dark brown or black at about 69° C., and to return to its original red appearance upon being cooled to about 35° C. The difference between the change-over temperature when the material is being heated and when it is being cooled is analogous to, for example, the hysteresis phenomenon observed in magnetic materials, and this phenomenon in thermochromic materials is conveniently referred to as a hysteresis effect. An alternate manner of referring to the effect is to say that the reflectivity is a double-valued function of temperature at certain temperatures.

The relatively low temperatures at which color changes occur with cuprous mercuric iodide make it attractive as a safe medium for use in plotting boards, wall-hung display devices, classroom teaching aids, etc. Thus, even if the material were at 69° C. and were unexpectedly touched by an observer, the material would feel warm but there is to risk of injury. Indeed, it has been suggested that touching with a hand a material which is warmer than body temperature of 98.6° F. is one way of demonstrating the thermal conductivity of a person's hand. With thermochromic materials, such a demonstration can indeed be carried out, but only if conditions are such that the material is in or near the hysteresis temperature region. That is, the heat removed by the hand must cause at least some of the material to experience a change in temperature which is accompanied by a change in color, and not merely a change in temperature alone.

While it has been previously recognized that a hand has many characteristics of a conductive (or at least a non-insulative) body, and that it can affect the color exhibited by a thermochromic material if certain conditions are satisfied, one thing that has not been previously reported is the extremely high resolution that can be achieved under certain circumstances with a thermochromic material and the benefits that can flow therefrom. That is, others have merely suggested that a thermal image of a hand might be created on thermochromic material. While there can be no quarrel with this suggeston, it fails to intimate a much more significant property of such materials. It has now been found that under proper conditions a thermal image can be created of an element which is many orders of magnitude smaller than the size of a hand. Thus, for example, it has now been found that thermochromic materials have sufficient resolution that it is possible, under certain circumstances, to create a startlingly clear thermal image of each of the small raised portions or friction ridges that in combination provide each individual with his own unique fingerprints, sole prints, etc. In fact, not only are the individual minutiae (i.e., the ridge endings and bifurcations) discernable, but also details of the individual pores occurring in the ridges are seen. Hence, the image created with the thermochromic material described herein includes the external boundaries or sides of a ridge as well as the relief of the area between said boundaries, i.e., that area where the pores in a ridge occur. While recognition of this capability is significant, it is even more meaningful when it is combined with a means for creating a permanent record of the thermal image, as described herein. For example, it has also been found that a simple black and white photograph of such a thermal image produces an excellent facsimile of the original thermal image. Such a photograph is capable of not only capturing but often enhancing the contrast in the image produced by the friction ridges and the valleys therebetween, with the result that an excellent and permanent record of the thermal image is easily and economically obtainable.

It may be noted that the technique briefly described above for obtaining fingerprints (or facsimiles thereof) makes no mention of a requirement for ink. The significance of this will not likely be overlooked by every person that has ever had his fingerprints recorded with the conventional ink-transfer method, for it is an experience that one does not readily forget. For the purpose of comparison, however, the laborious steps which are characteristic of that process will be briefly recited here. First, a small quantity of special ink like printer's ink is placed on an inking slab and then kneaded and rolled thoroughly (sometimes for thirty minutes or more) until a thin film of ink uniformly covers the slab. Next a person's dry, clean fingers and thumbs are pressed individually into the ink and then pressed in a rolling motion from side-to-side onto the registration card. Then, the left four fingers are taken simultaneously, the right four fingers simultaneously, and the thumbs are taken again. Although not a part of the prescribed routine, it should be acknowledged that during the process both the person being fingerprinted and the person who is taking the prints are usually stealing some of their attention from the prints in order to watch each other and everything that has already been touched with ink. This extra care is not unjustified, for most persons known that any ink which is accidently smeared on a shirt, dress, etc., will never come out after it dries. If all of the prints are clear, the fingerprinted person must then wash his hands and repeat the process for the second or third card, etc., which is usually required. The average time for an experienced person to take the fingerprints of a limber and helpful subject is about fifteen minutes, which includes some occasional errors caused by a finger that slipped and caused a blur on the card.

Modern fingerprint inking compounds are admittedly superior to those of former years, when it usually took abrasive hand cleaners and two weeks or so of wear to remove the last traces of a fingerprinting experience. Women in particular found the problem of cleansing their hands after fingerprinting to be offsensive, with the result that they would not submit to it except where it was absolutely required. Hence, all of the advantages to various persons and agencies of having everyone's fingerprints on file in a central depository have never really come close to being fully realized. Thus, in cases involving amnesia victims, missing persons, and unknown deceased persons, fingerprints have proven to be an effective tool in effecting identification. In addition to their acknowledge value in the apprehension of criminals, fingerprints can be invaluable in effecting identification after tragedies involving fire, flood and vehicle crashes, etc. In spite of the benefits that might be obtained, because the conventional ink method of making fingerprints has been so notoriously slow and messy, there has never been a local or national program of obtaining fingerprints which has had any real chance for obtaining wide acceptance.

Accordingly, it is a major object of this invention to provide an inkless fingerprinting method and apparatus.

Another object is to provide a method of recording fingerprints which is faster and cleaner than conventional inking methods.

A further object is to provide an apparatus for creating thermal images which is characterized by a simple construction having a simple mode of operation.

Yet another object is to provide an appaartus for producing multiple copies of fingerprints, footprints, and the like, with less total work than is normally required to obtain conventional multiple copies.

A still further object is to provide a fingerprinting device which is characterized as particularly sanitary.

Other objects and advantages will be apparent from the specification and claims and from the accompanying drawing illustrative of the invention.

Figure 1:
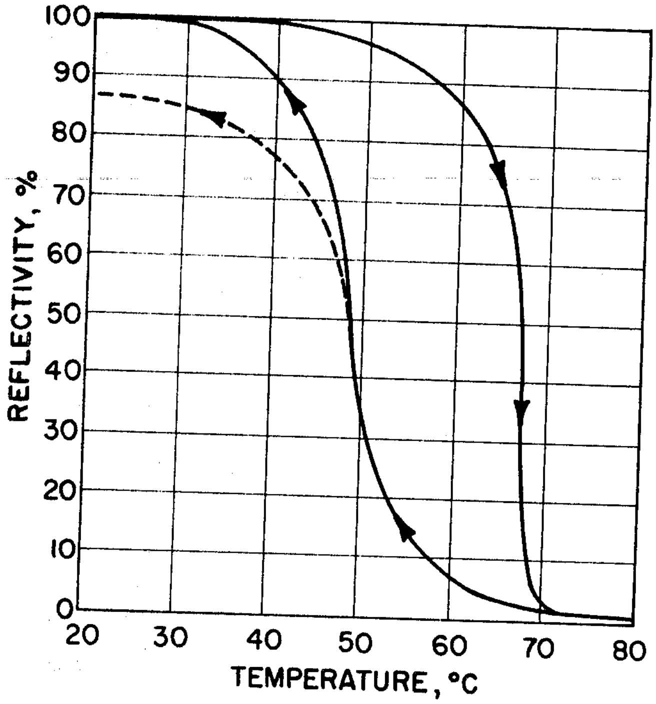
FIG. 1 is a plot of reflectivity of red laser light versus temperature for copper mercury iodide.

With initial reference to FIG. 1, the invention makes advantageous use of the hysteresis effect that is characteristic of thermochromic materials such as copper mercury iodide, e.g., $Cu_2HgI_4$; and for simplicity, reference will generally be made herein to this material alone. It should be understood, however, that many other thermochromic materials could be substituted for $Cu_2HgI_4$ without affecting the operation of the invention, and these other materials properly fall within the scope of the invention. For example, all of the compounds having the general formula $M_2M^1I_4$ where M is either $Ag^{1+}$, $Cu^{1+}$, or $Tl^{1+}$ and $M^1$ is either $Hg^{2+}$ or $Cd^{2+}$ are known to exhibit the type of thermochromism which has utility in the invention. Besides the ternary iodides, other compounds including several ternary chalcogenides having the formula $MM_2^1X_4$ where M is Zn, Cd, or Hg, $M^1$ is Al, Ga, or In, and X is S, Se or Te exhibit thermochromism with temperature transition ranges that are practical for use in devices disclosed herein. To generalize, it is believed that the thermochromic materials which are most useful are those which apparently experience a rearrangement of cations in a closely packaged anion crystal lattice when subjected to temperature change in a particular range, as contrasted with those materials that change color as a result of some chemical reaction.

The change in color of the thermochromic materials under consideration is actually the result of a change in reflectivity, and their usefulness is actually enhanced as the ambient illumination level is increased. Ordinary illumination, however, as is customary in the modern office or home, is more than adequate to cause a material to manifest its respective reflectivities. Since a source of illumination is always present in working areas where people are present, the need for it in conjunction with devices of this invention can be summarily disregarded.

As indicated in FIG. 1, $Cu_2HgI_4$ is a bright red at room temperature, and it retains its full brightness until it reaches approximately 45° C. where increasing temperature causes it to gradually lose some of its reflectivity. After reaching about 60° C., the reflectivity falls off rapidly until the material appears so dark that it properly described as black at near 70° C. A further increase in temperature has little appreciable effect; for the material soon reaches what may be described as a saturated black state, where it remains for all practical purposes in spite of further heating (up the point where oxidation is severe). When the material is cooled from its saturated black condition, it does not follow the same path it followed when its temperature was being increased. Rather than being completely reversible, the material demonstrates what is conveniently described as a classical hysteresis effect, and the reflectivity increases with decreasing temperatures along a path which is displaced some 16° or 17° C. below, i.e. to the left of, the "temperature increasing" path. The rate of increase in reflectivity begins to taper off as the material cools to about 45° C., and (when slowly cooled) the material does not reach its maximum reflectivity, i.e., it is not red-saturated, until it reaches about 30° C. As with a temperature increase when the material is already black-saturated, a temperature decrease below 30° C. has little effect; for once the material is truly red, a further decrease in temperature produces essentially no further change in reflectivity.

With some commercially available thermochromic materials, the hysteresis curve may not be truly symmetrical (in the classical manner), if the cycle time is short. For example, with $Cu_2HgI_4$, it has been experimentally found that the material may not recover its full red reflectivity within 5 or even 10 minutes when it is rapidly cooled from its high temperature reflectivity. This delayed recovery is shown by the broken line in FIG. 1. Delayed recovery is of no real consequence to the invention, however, since it occurs in a region which is of relatively little significance. Accordingly, the curves will be referred to as if they were always like the curve shown in solid lines, i.e., as if they were as symmetrical as classical hysteresis curves.

Since the temperature at which the material can be accurately said to be 100% saturated is very difficult to ascertain (because it approaches a true 100% saturation condition asymptotically), it is more practical and is legitimately defensible to assign the term "full saturation" to any reflectivity which is within, say, 5% of a pure saturation condition. Thus, cuprous mercuric iodide in its cold state can be said to be "full red" at any reflectivity measured as 0.95 or higher, while the material in its hot condition would be said to be "full black" when its reflectivity is 0.5 or lower. For simplicity herein, however, the modifier "full" can be readily omitted, as long as it is recalled that expressions such as saturation temperature, saturated condition, etc., which are used herein are not meant to narrowly restrict the invention to conditions involving either 100% or 0% reflectivity.

While necessity dictates that a reflectivity of 5% or less, for example, be accepted as equivalent to no reflectivity, at the same time prudence dictates that the definition of saturation should not be treated too loosely. Hence, it should perhaps be said that it is not intended herein to stretch the term saturation so as to encompass, for example, reflectivities well between the knees of the hysteresis envelope.

The two paths traced out by the material in moving between its two extreme reflectivities form a loop which constitutes the envelope that will enclose all of the paths followed by the material regardless of its temperature history. The hysteresis loop, then, may be said to be bounded on its high end by the minimum temperature at which the material is (black) saturated, and bounded on its low end by the maximum temperature at which the material is (red) saturated. The fact that the ends of a loop may not always be precisely locatable with a particular material is of little consequence, since the operating region of the invention is nearer the center of the loop than it is near the ends.

Figure 2:
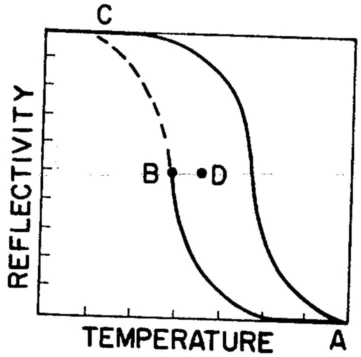
FIG. 2 is a schematic plot of reflectivity versus temperature which is similar to FIG. 1.

For reference purposes, the loop is shown by a phantom line in all of the graphs of temperature versus reflectivity. In FIG. 2, the solid trace indicates that the material has been heated to the minimum temperature at which it may be said to be saturated with its high temperature reflectivity (represented by the point A), then cooled to about 45° C. (represented by the point B). If cooling were to continue, the path would continue on toward point C. If, however, the cooling is interrupted and some heating is effected, the traced path will be, in a classical hysteresis manner, in the direction of point D.

Figure 3:
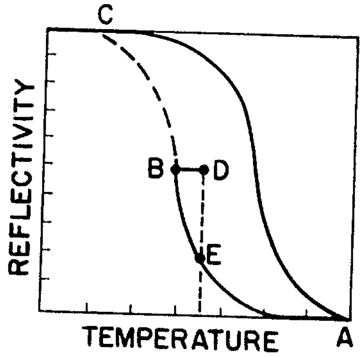
FIG. 3 is another schematic plot of reflectivity versus temperature which is similar to FIG. 2, wherein the material has a slightly different thermal history.

In FIG. 3, substantially the same path to point A is shown as was indicated in FIG. 2, thereby indicating the same thermal history. All of the material is then cooled to a holding temperature of about 55° C., which is represented by point E, where the material is imaginatively divided into two portions for exemplary purposes. One portion of the material is held at point E while the remaining part is further cooled to about 45° C., represented by point B. The cooled part is then reheated to 55° C. which carries it to point D. It will be apparent, then, that all of the material is once again at the same temperature, but the two imaginative portions will exhibit diverse reflectivities in accordance with their respective temperature histories. Thus, one portion will appear red and the other portion will appear relatively black. The material will remain in this state more or less indefinitely as long as the temperature of the material is held constant, i.e., at 55° C. A similar procedure can of course be followed with any number of portions, and any holding temperature within the hysteresis region. Furthermore, it is not absolutely necessary that the portions that are cooled the most should be brought back to the earlier-reached holding temperature; but as will be more evident later, the controls for a practical device can be made relatively simple if only a single temperature is to be usually maintained.

Having described some of the physical properties of thermochromic materials, a foundation has been laid which should make the devices to be described hereinafter more meaningful.

Figure 4:
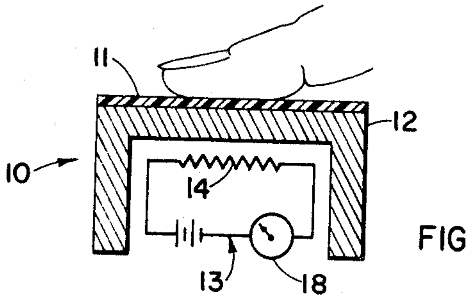
FIG. 4 is an elevation view of a simplified thermal imaging device.

With reference to FIG. 4, a thermal imaging device 10 is shown which has a layer of thermochromic material 11 on top of a body 12, said body being fabricated preferably from a material which is a good conductor of heat. Such materials are well known and include, for example, metals such as copper, aluminum, and alloys thereof, etc. The thickness of the dry thermochromic material is preferably between 1 and 5 mils. A material 11 such as cuprous mercuric iodide is commercially available in the form of a fine powder and can be conveniently placed on the body 12 in a variety of ways. For example, it can be applied to the body 12 by placing it in a carrier such as varnish and subsequently applying the varnish to the body by brushing, spraying, or dippings. Examples of varnishes which are compatible with cuprous mercuric iodide include those of the polyurethane type and the silicone type. Some initially liquid vehicles, however, will react chemically with cuprous mercuric iodide, turning it black and rendering it unsuitable for creating thermal images; such liquids include acrylic lacquers, epoxy resins, and cellulose-base cements.

An optimum proportion for mixing the powdered thermochromic material in a varnish is approximately 2.7 parts of material to one part varnish, by weight. If the mixture contains far too much of the powdered material, the mixture will be relatively difficult to apply, and the dry mixture will not be as smooth as might be desirable; furthermore, the binder might be incapable of securely locking in all of the material. The result of the last-named difficulty is that the surface of the dry mixture appears to be somewhat flakey or crumbly, such that portions can be scraped off with a hard object or even a fingernail. If a mixture is created which contains far too much varnish or other binder, the relatively dense thermochromic material will tend to settle to the bottom of the wet mixture. The result of this can be that the binder will harden over the thermochromic material forming an insulating layer which inhibits the transfer of heat from the device 10 by conduction, said transfer being a function upon which the invention depends for its operativeness. As will be explained later, a relatively thin insulating material over the thermochromic material is not always so deleterious as to render the device 10 inoperative; but an excess of insulating material around the thermochromic material materials should at least be avoided when possible.

If it is desired to employ cuprous mercuric iodide as the thermochromic material 11 and the body 12 is to be made of aluminum, it will likely be necessary to protect the aluminum by applying, for example, a spray coat of acrylic plastic or the like. Such protection is required because bare aluminum is attacked to some extent by cuprous mercuric iodide; but since protection is so easily accomplished, this property of the thermochromic material constitutes no significant obstacle.

An alternative manner of placing the thermochromic material 11 on top of the body 12 is to incorporate the material within or on a thin film of polyethylene or the like, as the film is being manufactured. The completed film is then clamped to the body 12 with mechanical arms (not shown), held next to the body by a vacuum system, or secured to the body with a suitable adhesive.

Shown schematically adjacent the body 12 is one of the alternative means for raising the temperature of the layer of material 11 to a desired value or set of values, said means constituting an electrical circuit 13 having therein a resistance heating element 14. The element 14 is located adjacent the body 12 so as to transfer heat to the body which is in turn transferred to the thermochromic material 11. This technique is analogous to that employed in the conventional electric percolator found in many homes, and the considerations of coil size, spacing, insulation, etc., involved there are sufficiently well known so as to make a detailed description of the circuit unnecessary.

Figure 5:
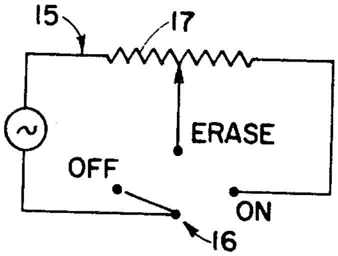
FIG. 5 is an alternative to the type of heating circuit shown in FIG. 4.

A variation from the circuit of an electric coffee pot which is particularly advantageous is shown in FIG. 5. In the circuit 15 a three-position switch 16 has positions labeled in terms of their function in a thermal imaging device such as that previously described. As suggested by the position labeled ERASE, the circuit 15 is adapted to provide an appreciable, but not necessarily long, surge of current which will carry a thermochromic material 11 to approximately the minimum saturation temperature at which its high-temperature reflectivity is established. Thus, with cuprous mercuric iodide, the ERASE temperature would be about 70° C. and the high-temperature reflectivity established would be black. As indicated in FIG. 1, this reflectivity can be essentially retained for an extended range of lower temperatures, such that the material 11 can be actively cooled (by use of a fan or the like), or passively allowed to cool, to a lower holding temperature without effecting an appreciable change in reflectivity. To this end, the switch 16 is preferably spring-loaded such that it will automatically move to the ON position whenever a person's grasp of the switch is released. When in the ON position, the resistor 17 is of such a size that it maintains the material 11 at an arbitrary holding temperature between the maximum and minimum saturation temperatures. Since it has been found that the greatest rate of change in reflectivity begins to occur about midway between the maximum and minimum saturation temperatures, the holding temperature for cuprous mercuric iodide is ideally set at about 55° C. (131° F.).

While the inside temperature of most offices in the United States is customarily held at between 68 and 72° F., the temperature in other facilities such as for example, hospitals, is usually kept at between 70 and 80° F. In England, however, room temperatures during winter months are usually maintained at appreciably lower values than would likely be considered comfortable to most Americans. Thus, it is possible that the environment in which a device 10 is being operated may vary by as much as 10° C. from the temperature at which the device might be calibrated at the factory. Since the room temperature will affect to some extent the temperature at which a given resistance will maintain the device 10, it is usually preferable to include some form of rheostat or temperature control means in the electrical circuit. Such a means is represented in FIG. 4 as rheostat 18. It will be understood, of course, that any of a variety of temperature control devices could be employed, with the choice of a given one being dependent on physical size limitations, budget considerations, the accuracy required, desired speed of response, etc.

There are other means, of course, besides electrical resistance means for raising or controlling the temperature of the thermochromic material. For example, a hot air gun can be positioned to blow hot air directly onto the thermochromic material 11. If the body 12 has a large area and is made relatively thick, say, ½ inch, it might take a few minutes to bring the device 10 from room temperature to 70° C. with a hot air gun; but having obtained that temperature (and the corresponding reflectivity), the body will retain its heat and the material 11 its reflectivity for a relatively long time without the further addition of heat. If the body 12 is made small and thin, it quite naturally is capable of being heated rapidly; but it will also cool quickly, so that a temperature controlling means would have to be equally quick to respond to a sensed change in temperature which is beyond an optimum temperature range. It will be evident, too, that the body 12 need not be an excellent conductor of heat if the hot air is supplied from the top and not the bottom of the body.

Another example of a means for affecting the temperature of the thermochromic material 11 is to expose the material to radiation such as that produced by, for example, an infrared heat lamp. The relative position between the material and, for example, two bulbs, can be set so that the material is raised to its minimum (high-temperature) saturation temperature when both bulbs are turned on, and is merely held at a desired holding temperature when only one bulb is turned on.

Hence, it will be apparent that a variety of means exist for controlling the temperature of the thermochromic material within useful limits.

Figure 7:
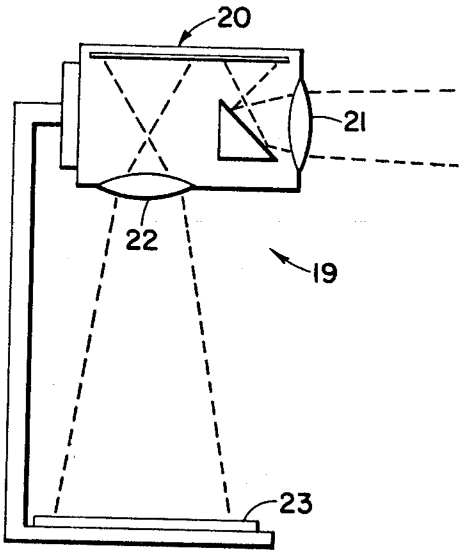
FIG. 7 is a schematic representation, in elevation, of a device for photographing a document, a fingerprint and a person's face simultaneously.
Figure 8:
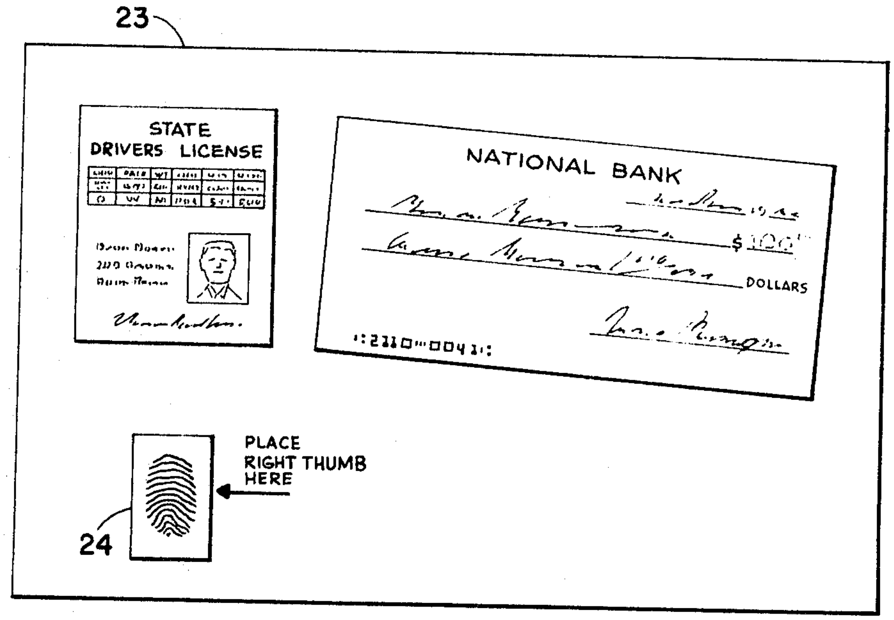
FIG. 8 is a plan view of one object plane of the device shown in FIG. 7.

The device shown in FIG. 4 will be recognized as being suggestive of devices that can be built rather than being indicative of the sole manner of constructing a device to utilize the invention. Representative of more elaborate constructions is the apparatus shown in FIGS. 7 and 8 which is similar to those sometimes employed by stores that make it a practice to cash checks as a convenience for customers. The apparatus 19 includes a camera 20 with first and second lenses, 21, 22 arranged to provide two fields of view which are recorded side-by-side on a single negative. Thus, lens 21 is adapted to provide an image within the camera 20 of the face of a person standing directly in front of the camera, while lens 22 is adapted to simultaneously provide an image of whatever papers or objects are present on a tray 23. Such papers would normally include, for example, the check which the store is cashing, and an identification card of some kind such as an automobile drivers license, etc. In addition, a small area 24 is identified by a suitable label (for the benefit of the person who wants the check cashed) as being the spot where a certain finger is to be applied so as to leave a fingerprint. The area 24, of course, contains a thermochromic material of the type described earlier with reference to FIG. 4. When the cashier is satisfied that the things to be photographed are in order, the cashier merely actuates a switch connected to the camera that automatically trips two shutters associated with the lenses 21, 22, advances the film, and subsequently erases the fingerprint by momentarily raising the temperature to its saturation level.

An apparatus 19 should have appreciable utility even though it shows room for only one fingerprint, because for one reason, the thermal image created by merely touching the area 24 is so extremely clear, especially in comparison with previously known ink-type fingerprints. Clarity in fingerprints is more than something which is desirable; clarity is essential. Thus, at the beginning of 1966 the Identification Division of the Federal Bureau of Investigation of the United States had in its files the fingerprints of approximately 175,000,000 persons, and was receiving approximately 25,000 new fingerprints daily. Nevertheless, the correspondence of an initially unknown set of fingerprints with a set on file can usually be established in this Division within less than thirty minutes after they are classified. The ability to quickly identify a fingerprint is the result of the employment of a sophisticated classification system developed by the FBI and based on the system devised by Sir Edward Henry. The FBI system uses all 10 fingers, and the classification is expressed in a formula consisting of a combination of letters and numerals which identifies the pattern (e.g., loop, whorl or arch) and indicates the results of certain measurements. The opportunity to establish correspondence between a fingerprint set on file and a set that is in question is primarily dependent on the ability of a person to properly classify the prints. One of the most important steps in this classification is counting the ridge lines between appropriate loops, deltas, etc. Thus, any lack of clarity which might cause the classifying person to miscount the number of ridge lines would make difficult the process of arriving at a correct identification of the questioned print. It will be almost obvious, too, that merely having a set of fingerprints on file among 175,000,000 other prints is of reduced value if the prints were improperly classified so that they cannot be quickly located in accordance with standard procedures. Hence, the conclusion naturally follows that the more accurate the initial step of properly classifying fingerprints is, the more accurate and the quicker will be the establishment of correspondence between an unidentified print set and an identical print set already on file.

At the same time a fingerprint was taken in the embodiment described above, a photograph of the person's face was also taken, such that two complementary pieces of evidence are available for apprehension and conviction of an offender. The availability of both a fingerprint and the photograph should be of greater total value than would be the sum of the values of each if used alone. Accordingly, it is believed that an apparatus which is adapted to accommodate only one finger can be of appreciable value.

It must be remembered, too, that a certain amount of public resentment might be encountered when a device like the device 19 is first put in use if a person were asked to submit a full set of fingerprints in order to cash a check, whereas taking only one print would more likely be considered to be a small inconvenience and relatively harmless. If a public information campaign were conducted explaining why the device is being used, the novelty of it might even attract people rather than repel them. Thus, if more people realized how much money an average businessman loses as a result of cashing fraudulently written checks for customers, and if more people realized that losses on bad checks must be made up by charging higher prices for the things that honest people buy, it is believed that the public would more quickly accept the use of devices such as apparatus 19. It is conceivable that honest people who have nothing to fear from having their fingerprints taken might even wear their willingness to use such a device as a badge of honor, knowing that the significance of their act is not likely to be overlooked by others.

Just as it is believed that honest people will have no reservations about the use of the apparatus 19, it is believed that those who are not scrupulous will be wary of it and will avoid it. Whether the apparatus directly leads to conclusive identification of a person and recovery of money fraudulently obtained, or it indirectly leads to lower losses by frightening away the unscrupulous, the benefit to the businessman, bank, etc., employing the apparatus 19 is the same, of course.

Figure 6:
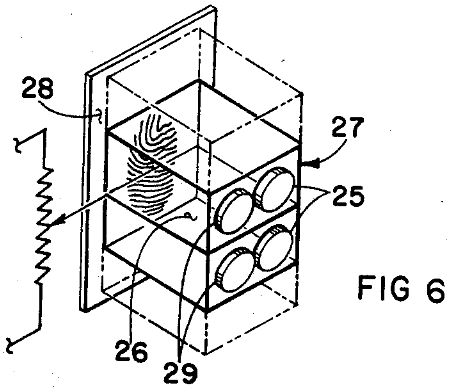
FIG. 6 is a schematic representation of an optical scanning device adapted to convert a thermal image into an electrical signal.

While making a photograph of the thermal image of a finger is one way of preparing a permanent record of the thermal image, it will be noted that this method suffers from the usual requirement that some person must still classify the fingerprint before a search in some file for an identifying print can begin. An alternate manner of making a permanent record avoids this human step by substituting an electronic scanning means like that described in U.S. Pat. 3,200,701 to W. White entitled "Method For Optical Comparison of Skin Friction-Ridge Patterns." A schematic representation of a scanning means as taught in the White patent is shown in FIG. 6. The means includes a pair of photocells 25 separated by a partition 26 in an enclosure 27 with one side of the enclosure comprising a surface 28 having thermochromic material illuminated by light sources 29. The photocells 25 provide electrical signals to a comparator (not shown) in accordance with the intensity of light reflected from the thermal image. The light intensity ratio between the two areas of the thermal image which are being viewed by the photocells 25 is used in a manner which eventually provides an electrical signal which is representative of the thermal image and hence of the skin friction-ridge pattern. Accordingly, the thermal image which constitutes a facsimile of a fingerprint can be classified electronically and a search for an identical fingerprint initiated automatically, with the result that positive identification is expected to be feasible without the interjection of human analysis.

Another use for a device such as that shown in FIG. 4 is in the taking of foot prints of new-born children in hospitals. Since there is no requirement that ink be applied to a baby's foot, making foot prints would be far more sanitary than the system presently in use in most hospitals today. Too, the difficulty caused by the tendency of printer's ink to serve as a lubricant and to permit the foot to move relative to the paper would be avoided, because the thermochromic material 11 is normally dry; hence, a foot would not tend to slide with respect to thermochromic material like it would with present materials. The surface of the thermochromic material 11 can be cleaned with most any conventional antiseptic before and after use so that there is no danger of transfer of germs from one baby to another. Care must be taken, however, to insure that the nurse who is holding the device does not let her fingers accidentally touch the thermochromic material (when it is prepared for taking prints) even if she has on so-called surgeon's gloves; for it has been found that the material, when prepared in accordance with the disclosure herein, will produce excellent thermal images even through latex surgeon's gloves. Because of this property, it may be seen that when the expression "thermal contact" with the thermochromic material is used, it is intended to infer contact in a broad sense, limited only by the requirement that heat transfer be by conduction. That is, thermal contact between a finger and the material need not be actual or physical contact; for thermal contact as employed herein can be achieved even through materials that are usually known for their insulating properties. It is therefore possible to cover the surface of a thermochromic material with a thin sheet of plastic or the like (much like articles of food, etc., are wrapped in cellophane for retail sales), to protect the thermochromic material from scratches, dirt, etc. An advantage that flows from this is that, in making fingerprints, the fingers need not be so clean and free from normal body oils as is the case with ink-transfer techniques. Accordingly, a thin sheet of plastic can be placed in contact with the thermochromic material, and the fingers can be pressed against the plastic, with the result that any dirt or oil transferred by the fingers to the plastic is discarded along with the used plastic, leaving the thermochromic material as clean as it was before the fingerprints were taken. By replacing the plastic after each person's use, no person need ever actually touch the same matter that the preceding person touched. It will likely be required, however, that a person whose prints are being taken through a rubber or plastic sheet must hold his finger in place for a longer period of time than if he were having prints taken by direct contact with the thermochromic material. That is, with direct contact, a thermal image can be created in a period of time shorter than the time it takes a person to respond to the sensation of contact and remove his finger (sometimes known as reflex time), which is a small fraction of a second. With a thin insulator between the finger and the thermochromic material, it may be necessary to leave the finger in place for over a second or two in order to allow time for the finger ridges (as well as possibly the covering material) to absorb heat from the thermochromic material. While the covering material will perhaps absorb some heat throughout, it absorbs significant quantities only where the ridges exert pressure.

As long as the substrate or base on which the thermochromic material is placed is not too thin, i.e., a few thousandths of an inch, the heat contained by the base when it is at operating temperatures is sufficient to prevent so-called bleeding of the thermal image created by the ridges when they cool certain portions of the material. Accordingly, even if a person's finger is left on the material for a relatively long time, the thermal image is not blurred or impaired to an extent that is discernible, at least by the naked eye. For example, it has been found that there is no discernible difference between images created by leaving a finger in contact with the material for only 0.1 second and having it in actual contact for 5 seconds.

While several applications have already been proposed herein, other advantageous uses of the material will no doubt suggest themselves to persons faced with specific problems, and it will be recognized that all possible uses cannot possibly be treated herein. A few more examples, however, will serve to demonstrate the versatility of the invention. For example, it would be possible to construct a security system to admit only authorized personnel to a safe, a room for storing narcotics, a military facility, etc., by combining a surface for creating a thermal image, a scanning device as described herein for converting the thermal image into an analog signal, and an electrically operated lock system which opens only when a gate is triggered by a signal from a processor operating on data from the scanner. The lock system would be programmed, for example, to respond favorably only when the fingerprints of a person seeking admission to a room, etc., are found to correspond with prints that have already been stored for later comparison by a comparator or the like.

Such a system would obviously be much more secure than a system which uses keys or other devices which could be lost, stolen, improperly duplicated, etc.

The same principle of using fingerprints to trigger a switch would apply if for some reason it were felt necessary to absolutely control entry of persons to a hospital operating room. Thus, a surgeon who has scrubbed and has on gloves and a mask, which would not only conceal his face so as to preclude visual identification, but would also alter his speech so as to make inconclusive a voice identification), could walk up to a security device, place his gloved finger or fingers in appropriate places, and then enter the operating room when a comparator signaled a favorable comparison with one of the fingerprints in a memory bank and subsequently opened the door.

While the use of thermochromic material in a fingerprint device as described above would be relatively sophisticated, there are other uses which do not require special equipment and indeed can make use of rather common devices found in many homes. Thus, if a law-enforcement officer wanted to secure fingerprints away from his office in a remote location, he could employ any heating device such as a stove, a hotplate operated off of an automobile battery, etc. Too, a conventional electric toaster could be employed to heat a special plate carried for just such a purpose, said plate being no larger than a slice of bread and having on one side a layer of thermochromic material of the type described herein. The toaster could be turned on its side and laid on a table, for convenience, and the plate inserted so as to leave the thermochromic material up, such that it is not scratched by the toaster. The toaster is then actuated by inserting the plate like a piece of toast or manually depressing the knob which activates the heating coils. If the timer can not be adjusted so as to leave the plate in the toaster long enough during one cycle to bring the material to its high-temperature reflectivity, the toaster can be repeatedly cycled so as to bring the material up to the desired temperature. No thermometers need be employed to measure temperatures, for the color of the plate can be used to visually determine when a desired temperature is reached.

It would not matter if the temperature of the plate was inadvertedly carried beyond an experimentally determined saturation temperature. Thus, if it had been determined that the thermochromic material had a reflectivity of 0.05 at 69° C., it would not matter significantly that the lack of fine control available with the toaster caused the material to go to 75° C. during the last "toasting" cycle. In arriving at 75° C. the material would have passed through the temperature designated as its minimum saturation temperature, and it would be ready to use. If desired, the hot material can be permitted to cool somewhat before a finger is applied, with experience with a particular plate being the best factor upon which to judge the need for speed in order to obtain a fingerprint before the entire plate cools too much. It will be apparent, too, that the earlier-described holding temperature need not be a single temperature held to, for example , ±0.01° C.; for the use of the expression "holding temperature" is meant to be broad enough to encompass at least a narrow range of temperatures. It is only necessry that the holding temperature be sufficiently above the temperature to which the material is cooled by thermal contact with a finger to assure adequate contrast in the reflectivities of the various portions. The contrast which is needed for a particular usage is not readily susceptible to rigid descripton, but an adequate contrast for some purposes has been achieved with a difference of only about one-tenth of the total range of reflectivity as shown in FIG. 1. After the thermal image is established on the plate by lightly pressing a finger thereagainst, contact between the finger and the plate is severed. Then, a camera can be employed to prepare a permanent record of the thermal image while the diverse reflectivities are still manifested by the finger-cooled portions and the remainder of the material, respectively. If Polaroid film is used in the camera, the fingerprints can be examined on the spot for satisfactory detail, and substitute prints taken if necessary. It has been found that the more commonly used Polaroid films provide excellent facsimiles of fingerprints, although Type 52 having an ASA number of 400 is preferred. The so-called high-contrast films are not necessary to achieve useable contrast between various portions, and they are often inoperative with cuprous mercuric iodide because they are not red-sensitive; but even these high-contrast films would work with other thermochromic materials which reflect colors other than red.

If conventional negatives are obtained with the camera rather than positive prints, the negatives can be used later to make as many copies of the prints as is desired. Furthermore, if there is any doubt about the number of ridge lines in a particular print, for example, the negative lends itself expeditiously to obtaining enlargments of the print wherein certain details may be more clear.

While several embodiments of the invention have been described is detail herein and shown in the accompanying drawing, it will be evident that various further modifications are possible in the arrangement and construction of its components without departing from the scope of the invention.

What is claimed is:

1. The method of producing a thermal image of a portion of a person's skin which has distinctive ridges by utilizing a thermochromic material having a hysteresis loop bounded by a minimum saturation temperature associated with its high-temperature reflectivity and a maximum saturation temperature associated with its low-temperature reflectivity, with said loop lying substantially above 98.6° F., comprising the steps of:

heating a layer of the thermochromic material to a temperature above body temperature and sufficient to establish a high-temperature reflectivity;

cooling the material to a holding temperature between said maximum and said minimum saturation temperatures;

establishing thermal contact between the person's skin and the layer of material such that those portions of the material which are thermally contacted by skin friction ridges are cooled with respect to those portions of the material that are not so contacted;

severing contact between the person's skin and the layer of material; and restoring the cooled portions of the material to approximately the previously established holding temperature.

2. The method of producing a thermal image as claimed in claim 1 wherein the thermochromic material is cuprous mercuric iodide and the heating step consists of heating the material to at least 69° C.

3. The method of producing a thermal image as claimed in claim 1 wherein the thermochromic material is cuprous mercuric iodide and the cooling step consists of cooling the material to a holding temperature of about 55° C.

4. The method of producing a thermal image as claimed in claim 1 wherein substantially all of the thermochromic material is cuprous mercuric iodide and including the further step of photographing the material with black and white film after contact between the person's skin and the material is severed.

5. The method as in claim 1 wherein the holding temperature is approximately midway between the maximum and minimum saturation temperature.

6. The method of obtaining a fingerprint which utilizes a thermochromic material having a hysteresis loop bounded by a minimum saturation temperature associated with its high-temperature reflective and a maximum saturation temperature associated with its low-temperature reflectivity, with said loop lying substantially above 98.6° F., comprising the steps of:

heating a layer of the thermochromic material to a temperature at least as high as said minimum saturation temperature;

establishing thermal contact between a desired finger and the material such that those portions of the material which are in register with skin friction ridges are cooled with respect to the remainder of the material to a temperature substantially below said minimum saturation temperature, whereby the cooled portions and the remainder of the material exhibit diverse reflectivities;

severing contact between the finger and the material to expose a thermal image on the material of that portion of the finger which was in thermal contact with the material;

heating to a temperature lower than said minimum saturation temperature those portions of the thermochromic material that have been previously cooled by thermal contact with said skin friction ridges, and preparing a permanent record of said thermal image while said diverse reflectivities are still manifested.

7. The method of obtaining fingerprints as claimed in claim 6 wherein the step of preparing a permanent record of said thermal image consists of photographing the material.

8. The method of obtaining a fingerprint as in claim 6 wherein thermal contact is established for a period of time between 0.1 and 5 seconds.

References Cited

UNITED STATES PATENTS

| | | |
|---|---|---|
| 2,945,305 | 7/1960 | Strickler. |
| 3,090,697 | 5/1963 | Lawton et al. |
| 3,158,523 | 11/1964 | Morrow. |
| 3,169,064 | 2/1965 | Leuy. |
| 3,383,657 | 5/1968 | Claassen et al. |
| 3,408,217 | 10/1968 | Obuchi. |

FOREIGN PATENTS

| | | |
|---|---|---|
| 1,010,234 | 11/1965 | Great Britain. |

OTHER REFERENCES

Day, "Thermochromism," Chem. Reviews, 1963, pp. 65–80.

MURRAY KATZ, Primary Examiner

U.S. Cl. X.R.

35—66; 117—36.8, 132; 118—31.5; 346—21, 76, 135